United States Patent [19]
Murray

[11] Patent Number: 5,838,227
[45] Date of Patent: Nov. 17, 1998

[54] RADIO CONTROLLED ENGINE KILL SWITCH

[76] Inventor: Steve Murray, 300 Panorama Rd., Earlysville, Va. 22936

[21] Appl. No.: 845,431

[22] Filed: Apr. 24, 1997

Related U.S. Application Data

[60] Provisional application No. 60/016,260 Apr. 24, 1996.
[51] Int. Cl.$^6$ ............................................. B60Q 1/00
[52] U.S. Cl. ...................... 340/425.5; 340/426; 340/539; 340/604; 307/1
[58] Field of Search ................ 340/425.5, 426, 340/539, 506, 828.06, 604, 693, 605; 307/9.1; 440/1

[56] References Cited

U.S. PATENT DOCUMENTS

| | | | |
|---|---|---|---|
| 4,483,683 | 11/1984 | Alley, Sr. ................................. | 441/69 |
| 4,593,273 | 6/1986 | Narcisse ................................. | 340/539 |
| 4,785,291 | 11/1988 | Hawthorne ............................. | 340/573 |
| 5,274,359 | 12/1993 | Adams ................................... | 340/604 |
| 5,289,163 | 2/1994 | Perez et al. ............................. | 340/539 |
| 5,349,329 | 9/1994 | Smith ..................................... | 340/539 |
| 5,486,814 | 1/1996 | Quinones ............................... | 340/573 |
| 5,552,773 | 9/1996 | Kühnert ................................. | 340/573 |
| 5,642,095 | 6/1997 | Cook ...................................... | 340/568 |

Primary Examiner—Jeffery A. Hofsass
Assistant Examiner—Daryl C. Pope
Attorney, Agent, or Firm—Sheldon H. Parker

[57] ABSTRACT

A engine kill switch system has a transmitter and receiver which are linked through specific transmitted codes within a frequency. The receiver is mounted directly on the boat and wired to an engine kill switch, maintaining the switch in the closed position as long as a signal is received from all of the activated transmitters. Once the transmitter signal is unintentionally deactivated, the receiver shuts down the engine. A range adjustment allows the separation distance between the transmitter and receiver to be changed, dependent upon the size of the boat and end use. A strobe and audio warning can also be attached to the receiver and activated simultaneously with, or as an alternative to, the deactivation of the engine. Automatic transmitter activation and deactivation can be provided through storage ports tied to the receiver. The transmitter is a battery powered remote device carried by a user. The transmitter has a programmed unique code recognized by the receiver. The system, or individual components, are provided with deactivation codes entered through an input device. The system can also be used as an antitheft device simply by removal of one transmitter, thereby rendering the engine inoperable.

21 Claims, 7 Drawing Sheets

RADIO CONTROLLED ENGINE KILL SWITCH

This is a continuation-in-part of application Ser. No. 60/016,260 filed on Apr. 24, 1996.

BACKGROUND OF THE INVENTION

1. Field of the Invention

A radio controlled engine kill switch automatically shuts off an engine upon deactivation of a recognized individual code being continually sent by a remote transmitter.

2. Brief Description of the Prior Art

Boating is a popular, although dangerous, sport. Although there are frequent reports of boating accidents causing fatalities, many deaths are caused when people fall overboard and drown prior to being found in choppy water. Various safety devices have addressed this problem, however none have provided the combination of mobility and safety.

In U.S. Pat. No. 4,483,683 a safety device design for use by a water skier is disclosed. The handle of the device contains a signal device which allows the skier to alert the boat and which also serves to indicate that the skier has fallen. The alarm is activated by a signal which is initiated by a conscious effort by the skier or as a "dead man's switch". The device, as taught by Alley, is applicable only to skiers and will not work for boat passengers.

Hawthorne discloses in U.S. Pat. No. 4,785,291 a monitoring device which is used to alert a parent when a child wanders beyond a predetermined distance. The remote when in the predetermined distance causes the receiver to issue a slow "beep". Once the remote approaches the parameter, the beep becomes more frequent until, once the remote is beyond the parameter the beep becomes an alarm. This issue is addressed again in Narcisse's patent U.S. Pat. No. 4,593,273 wherein an Out-of-Range Personnel Monitor and Alarm is disclosed. Narcisse's device utilizes a receiver and remote system which activates an alarm when the remote is out of a predetermined range. Similarly Perez et al in U.S. Pat. No. 5,289,163 discloses a Child Position Monitoring and Locating Device which activates an alarm on the receiver once the remote travels beyond the present distance. The device further includes a locating display which serves to locate the remote. Numerous other devices, have been disclosed which serve to indicate that a remote is beyond a predetermined range. The prior art devices, however, are for use in a controlled or uncontaminated areas and therefore are not provided with sufficient environment protection or range to be used as a boating safety device.

The need for a warning device around water is recognized in U.S. Pat. No. 5,274,359 issued to Adams. The transmitter of the '359 is attached to a child and allows for a directional indication of the location of the child. The transmitter is activated by water and commences sending an encoded signal to the receiver. The encoded signal also serves to assist in locating the child.

An existing boat engine kill switch is a tethered device which must be manually attached to the operator of a powered boat and offers no direct safety factor for passengers. The tethered boat engine kill switch deactivates the ignition on the engine in the event the operator reaches the threshold of the tether. This severely limits the mobility of the operator, especially under working conditions. Because of this lack of mobility, the tethered engine kill switch is rarely used and places the operator, and needless to say the passengers, in a potential life threatening situation in the event of ejection from the craft.

Although the danger around water has been recognized, none of the above prior art has addressed the issue of mobile water device safety pertaining to stopping the mobile device in the event of a passenger or driver overboard.

SUMMARY OF THE INVENTION

An engine kill switch system has a transmitter and receiver which are linked through specific transmitted codes within a frequency. The receiver is mounted directly on the boat and is directly wired into the existing engine kill switch wiring, thereby replacing, or supplementing, the existing kill switch. The receiver maintains the switch in the closed position as long as a signal is received from any of the activated transmitters. Once the transmitter signal is unintentionally deactivated, the receiver opens the kill switch and shuts down the engine. A range adjustment allows the separation distance between the transmitter and receiver to be changed, dependent upon the size of the boat and end use. A strobe and audio warning can also be attached to the receiver and activated simultaneously with, or as an alternative to, the deactivation of the engine. A locator device can be incorporated into the receiver to allow for easier location of a user possessing the deactivated transmitter. In one embodiment, storage ports can be provided on the receiver to hold the transmitters, thereby providing for automatic activation and deactivation. The transmitters can be either independent from the storage ports with any transmitter being deactivated by any storage port or specific transmitters being required for each storage port. An indicator light can be provided on the receiver to indicate which of the transmitters is no longer transmitting.

The transmitter is a battery powered remote device carried by a user. The transmitter has a programmed unique code within the specified frequency which, once linked and activated, is recognized by the receiver. The transmitter uses batteries and includes an indicator light to indicate a low battery.

The system, or individual components, are provided with over-ride codes which allow for deactivation. The override codes are entered through an input device and should be complex to avoid inadvertent shut down of the system. The system can also be used as an antitheft device simply by removal of one transmitter, thereby rendering the engine inoperable.

The engine deactivation system has at least one portable transmitter, with an independent power source, such as rechargeable battery, which transmitting a constant individually identifiable signal. A receiver receives and recognizes the identifiable signal from each of the transmitters. Receipt of the signal by the receiver maintains the cut-off in a run mode and interruption of the constant signal from one of the transmitters activates the activation mode. Reinstatement of the transmission of the signal places the cut-off means in a run mode. An on-off device on both the receiver and transmitter can be provided to deactivate each unit. The receiver also has a cut-off which is connected to the engine and maintains a run mode and a deactivation mode, the deactivation mode deactivating the engine. A distance controller varies the transmission distance between the transmitter and the receiver. An antenna transmits the signal between the transmitter and receiver. Audio and visual alarms can be also included. An emergency cut-off device should be provided to break transmission of the signal and place the cut-off means in the deactivation mode, stopping the engine. A protection device preventing the emergency cut-off from being inadvertently activated.

When the signal is blocked from the receiver the cut-off is placed into the deactivation mode, thereby cutting off power to the engine. The signal is blocked when the transmitter enters the water or is beyond the transmission range. An override allows the cut-off to be in said run mode without receiving a recognized signal. At least two indicator lights are provided which designate the power status of transmitter and said receiver, including the power level of the independent power supply within the transmitter. The indicator lights can be color coded to designate at least one of recharging, transmitting or low battery status check.

The transmitter can be stored proximate the receiver when not in use with transmission of the signal beginning upon separation of the transmitter from the receiver. The transmission is stopped once the transmitter is returned to the receiver.

The receiver can have a coding system which takes the individually identifiable signal from each of the transmitters and codes the receiver to recognize each signal. A data processor can receive data from both the receiver and transmitter, integrating the data into a database and displaying data.

BRIEF DESCRIPTION OF THE DRAWINGS

The advantages of the instant disclosure will become more apparent when read with the specification and the drawings, wherein.

DETAILED DESCRIPTION OF THE INVENTION

The radio controlled engine kill switch system disclosed herein provides a safety and security device for use on boats, jet skis, and other water craft, as well as a security device for other motor run vehicles. The system maintains activation of the engine only while signals are received from all activated transmitters which have been partnered with the individual receiver. The transmitters disclosed herein are small and can be worn on the user's belt, wrist, around the neck or pinned to clothing. Although the transmitters can easily be incorporated into life jackets, statistics show that few people actually wear their life jackets, thereby eliminating the benefit of both the jacket and the transmitter. All of the equipment disclosed herein must be weather resistant and capable of withstanding salt water and the corrosion associated therewith.

Activating the receiver by breaking the transmitter signal provides a critical safety measure. It is critical to turn off the engine as soon as the party enters the water. A unit which institutes the signal upon entry of into the water can fail to obtain the desired effect if the unit is defective. In the disclosed invention, if the unit fails, it fails on the side of safety by turning off the boat.

Figure 1:
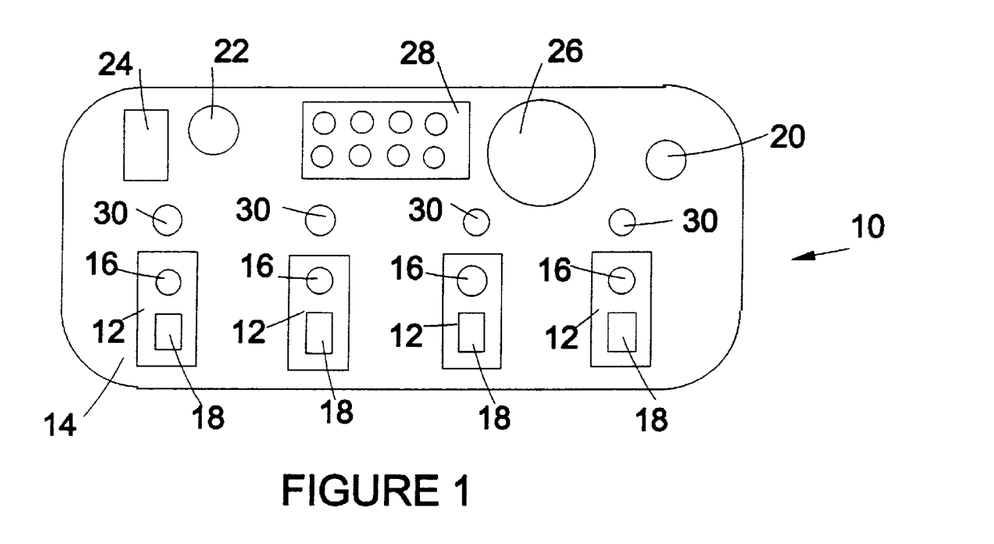
FIG. 1 is a front view of a radio controlled engine kill switch as designed for a small craft.

A multi-user radio frequency controlled receiver 14 with multiple transmitters 12, is illustrated in FIG. 1. The radio transmitters 12, worn by the operator and each passenger, are coded to interact with the radio receiver 14 installed in the boat or other motor water craft. The RF contact between the transmitter 12 and receiver 14 must be maintained in order for the engine to continue to run. In the event the RF contact is broken, the engine is immediately shut down. Although a wide range of radio frequencies and their respective antenna types, may be applicable, a frequency with low tolerance to transmission through water can be advantageous in some applications. For simplicity in explanation herein, reference will be made to boat engines, however the instant invention can be utilized to deactivate other motor driven water devices, such as jet skis.

The radio controlled engine kill switch system 10 allows the operator and the occupants the freedom to move about the craft while providing the safety and security benefits of an engine kill switch. Upon boarding nearly any sized power boat, the operator, and all or some designated number of passengers, would attach a small radio transmitter 12 to either their bodies or clothing. Each transmitter 12 transmits its own unique signal which, once activated, is recognized by the receiver 14 mounted within the craft. Activation of the RF signal can be through removal of the transmitter 12 from the receiver 14, an on-off switch, or other means obvious to those skilled in the art. The RF signal can also be continually sent and received, although the drain on the battery is extensive with this method. The receiver 14 is preferably range adjustable and would be set depending upon the size of the craft and the intended use. Therefore, if the passengers were to be fishing, the range would be substantially narrower than if the passengers were water skiing. When the radio transmission from any of the activated transmitters ceases, a switch within the receiver 14 immediately reverses, deactivating the ignition system on the boat engine. With approximately 75% of all boating fatalities being directly related to the operator or an occupant being ejected from their craft, the radio controlled engine kill switch 10 becomes a potentially significant safety device in reducing boating fatalities.

The radio transmitter 12 component of the engine kill switch 10 is a weather proof device which would be secured around the neck, wrist, arm, waist or ankle of the occupant of a powered boat. When activated, the transmitter 12 transmits a constant radio signal which is recognized by the receiver 14. Depending upon various factors, such as types of antennas used, the transmitter 12 uses a specific, individual code which falls within a specific frequency.

In addition to the ability to deactivate the engine, the transmitter 12 preferably contains several safety features. Replaceable lithium magnesium dioxide battery or a rechargeable battery such as a NiCad, are optimal to allow the transmitter 12 to recharge while not in use. A visible low battery indicator 16 should also be contained in the transmitter 12 for use with both rechargeable and non-rechargeable batteries. It is also preferable that the transmitters 12 be designed so that a low battery produces the same result as a dead battery. This will minimize the chances of a battery going dead during use.

A manually operated "panic button" 18 installed in each transmitter 12 allows any occupant wearing a transmitter 12 to discontinue their individual transmitter's 12 signal, consequently deactivating the motor. This feature is especially useful in the event a passenger who was not wearing a transmitter 12 was thrown overboard. It is also helpful in the event pets or cargo are thrown overboard or other emergency deactivation of the boat is required. Thus, any passenger wearing a transmitter 12 can deactivate the boat's ignition using the "panic button" 18 without needing to notify the operator of the boat to manually shut down the engine. The panic button 18 can have a cover to avoid inadvertent activation, however, access to the panic button 18 must be rapid and uncomplicated. A spring loaded, flip up cover would be an example of a simple to use, rapid access, cover. Further, in the event younger children are "on board", it would be desirable to have either child-proof locks on the transmitter 12 or transmitters without panic buttons.

As stated, each transmitter 12 has a uniquely coded signal with its own ID which is, in turn, recognized by the receiver 14. One of the ways this can be accomplished is by the use of an application specific integrated chip or a microprocessor controller. An example block diagram for both a receiver and transmitter is disclosed herein in FIGS. 8 and 9. Other methods of recognizing specific ID codes will be known by those versed in the art. By having a uniquely coded signal, each containing its own ID, a large number of transmitters can be operated on a common frequency.

The radio controlled engine kill switch receiver 14 contains a switching device that replaces, or supplements, the engine kill switch on a powered boat. In the event the boat does not have an existing kill switch, the disclosed device can be directly wired into the engine electrical system as well known in the art. The receiver 14 is mounted directly on the boat, proximate the operator, and wired into the engine, replacing, or supplementing, any existing kill switch wiring. The switching device remains closed as long as the constant signals from all of the recognized, activated transmitters 12 are being received. In the event the receiver 14 loses the activated signal of one of the transmitters 12, the switch opens, grounding or discontinuing power to the motor ignition system and killing the engine.

As stated, the radio receiver 14 is preferably equipped with the ability to adjust the range of reception between the transmitter and the receiver. This can be through use of a variable sensitivity receiver controlled by a screw, knob or other device, as known in the art. The range adjustment is based on the size and use of the boat and would generally be done at the time of installation, with the control located inside the receiver 14. Alternatively, the control can be accessible and the adjustment accomplished by the operator of the boat through a range control 20. By providing the accessible range control 20, the operator is free to change the range dependent upon the current use. Thus, the range can be lengthened if the boat is being used for water skiing, or towing, and shortened for fishing or pleasure cruising. In the event the receiver 14 is equipped with an accessible range control 20, a time activated default range is preferably built into the receiver 14. In this way, if the operator sets the range for water skiing and forgets to reset the range, the receiver 14 will automatically reset the range to the default setting after a predetermined period. The ability to adjust the range is necessary to allow for a single system to be used with most sized crafts. For example, one would desire the deactivation of the kill switch within the receiver 14, upon the loss of a transmitter 12 signal, to happen sooner on a twelve foot craft than on a sixty foot craft. If the receiving range is adjusted the same for both, an occupant overboard on a sixty foot craft would be separated by a greater distance from their craft than an occupant overboard in a twelve foot craft. Depending upon conditions, this could create a life threatening situation. For use with commercial, military or larger crafts, the receiver would be larger and more powerful to accommodate the vast size of the ship and the large number of transmitters.

The electronic circuitry contained in the receiver provides the ability to search and recognize any codes within the specific frequency. At the time of manufacture, the receiver 14 is programmed with a specific frequency. In one method of recognition, the transmitters 12 are manufactured with each transmitting an individual code within this specific frequency. Only these individual codes are embedded within the receiver 14 as corresponding codes. The codes can be embedded into the receiver 14 in any number of methods known in the art. The receiver 14 coded in this manner has the ability to recognize only a certain number of codes within the frequency and the transmitters 12 must transmit only the pre-embedded codes. This is not a preferable method in that it limits the number of transmitters which can be recognized by each receiver and requires closer monitoring of the receiver production. Preferably, the receiver 14 has the capability of recognizing all codes within the frequency and only codes which are programmed into the receiver by transmitters will be active and recognized by the particular receiver. The programming can be "hard", such as switches, "soft", such as light, or other means known, which can transmit information from one source to another. There is an advantage to the receiver recognizing all codes and using soft programming, in that it allows the user to purchase additional transmitters, without concern for matching pre-embedded codes to the receiver, and add these transmitters without the expense of an installer. The receiver can be provided with a "program" mode in which it reads the information from the transmitter, thereby activating the code embedded within the receiver at the time of manufacture. Upon identifying the codes being transmitted, the receiver recognizes those codes as active transmitters. All activated transmitter codes are stored and loss of signal from any active code activates the engine kill switch.

The receiver 14 is preferably powered by a rechargeable battery, such as nickel cadmium, nickel metal hydride or lithium. The recharging can be achieved by either voltage conversion from a generator, alternator, magneto, magnets, or the like or via photo electric cells. Since all powered boat engines do not have an external power source it is critical that the battery be the energy source powering the receiver.

Within the scope of powered boat application, various types of antennas can be used with the receiver 14. The type of antenna being, in some instances, dependent upon the type and size of the boat. Examples of antennas which can be incorporated are omnidirectional, a rigid stick of an applicable size and length or a loop wire type encompassing the perimeter of the craft. For example, in a cruise ship application a loop antenna encompassing the entire ship may provide better coverage than an omnidirectional antenna due to the multi-deck construction. Frequencies will require coordinating with the type of antenna used, i.e. loop type antennas may require a lower radio frequency transmission than required by an omnidirectional antenna.

As a further safety feature, a signal/warning strobe 22 is preferably mounted directly on the receiver 14 or, alternatively, on the body of the boat. The strobe 22 serves as a visual reminder and/or warning notice that the kill switch transmitter 12 has been activated. The system is programmable so that in very rough seas where a sudden interruption of power could endanger a boat, the system can be set to trigger only the visual and audible systems. Additionally while it would be obvious for occupants of the boat if the power was interrupted, the strobe serves to warn people boating or diving off the main craft that a problem has arisen. More importantly, however, the strobe 22 acts as a beacon to assist occupants thrown overboard to locate their craft at night. The strobe 22 receives power through a self-contained battery 24, rechargeable or standard, and becomes automatically activated by the deactivation of a transmitter 12 signal. A separate ignition switch can also be provided to manually activate the strobe 22 while the engine is running. The strobe 22 can also be wired directly into the boat battery or other available power source.

When the transmitted signal from any of the transmitters 12 is broken, the strobe 22 begins to flash simultaneous with, or as an alternative to the opening of the previously described engine kill switch. The strobe 22 continues to flash until either the coded signal from the missing transmitter 12 is recognized by the receiver 14 or the strobe 22, and/or entire system 10 is deactivated.

An audio warning 26 can be incorporated for further safety, serving as a notification for all on-board and off-board passengers. The audio warning 26 is activated upon deactivation of the transmitter 12 signal. The audio warning 26 can be any pitch which can be heard over a distance and over the sound of the natural elements. By providing a pitch which will carry over the sounds of the ocean, the audio provides a second means to assist a person thrown overboard to locate the craft. It is also preferable that the audio warning 26 be intermittent to provide better locating capability.

The strobe 22 and audio warning 26, as well as the engine kill switch system 10, can be manually deactivated, although it is recommended that the deactivation be somewhat complex.

The radio controlled engine kill switch also serves as an antitheft device. As described herein the receiver will remain closed as long as all transmitter signals are being received. If the operator or an occupant of a powered boat were to voluntarily leave the craft, thereby leaving the predesignated field of the receiver, the switch within the receiver would open and render the boat engine inoperable. Since breaking the transmitter signal would activate the strobe and audio warning, manual deactivation is recommended prior to use as a antitheft device.

When the transmitter component 12 is used as an antitheft device, and will therefore be separated from the receiver, the strobe 22 and audio warning 26 should be manually deactivated until the transmitter signal was subsequently received. In the event a transmitter 12 is lost, stolen, or in some matter rendered inoperable, the operator may desire to deactivate the signal warning strobe 22 as a convenience. Deactivation in any case would become a conscious, manual decision by the operator. The signal warning strobe 22 deactivation is accomplished by entering a deactivation code into the receiver 14. This code would be a series of numbers, letters, symbols, light signals or the like entered via keypad, or other input devices 28. By successfully entering the warning strobe 22 deactivation code, only the signal warning strobe 22 would be deactivated. The switch within the receiver 14 will remain open due to the loss of a transmitter signal and the engine would remain inoperable. An automatic reset for the deactivation of the signal warning strobe would take place when the receiver 14 recognizes the transmitter 12 signal upon the transmitter's return to the receiver's range. The audio warning 26 can also be provided with the capability to be deactivated in the same manner as the strobe 22 and is preferably deactivated simultaneous with the strobe 22.

In the event the operator desires to override the entire radio controlled engine kill switch system 10, this would be accomplished in much the same manner as described in the deactivation of the signal warning strobe 22, using a more complicated code. This override procedure would close the engine kill switch allowing the engine to be operated without the kill switch. Deactivation of the engine kill switch would be a totally separate operation and should not render the signal warning strobe inoperable. Optimally, for safety, overriding the kill switch system would activate the signal warning strobe 22. Once the entire system is deactivated, deactivation of the signal warning strobe 22 would constitute a separate action and be accomplished using the prior described action. As a further safety feature, a "confirmation code" can be required if the engine kill switch system 10 and strobe 22 are deactivated within a certain time period from one another.

In the event a transmitter is lost, broken or otherwise rendered inoperable, the system must be notified that the transmission will no longer be received. This can be accomplished in several ways, the easiest of which is to manually turn off the engine and restart, thereby rebooting the system. This is only applicable to systems where the transmitters are not in physical contact with the receiver and are manually activated. In systems where the transmitters are tied to storage ports, the system must be notified and ordered to accept the transmission loss. This can be accomplished through preset entry codes through the input device. Alternatively, a "dummy" transmitter can be included with each system which transmits a code unilaterally accepted by all receivers and allows for the temporary reactivation of the engine.

Figure 2:
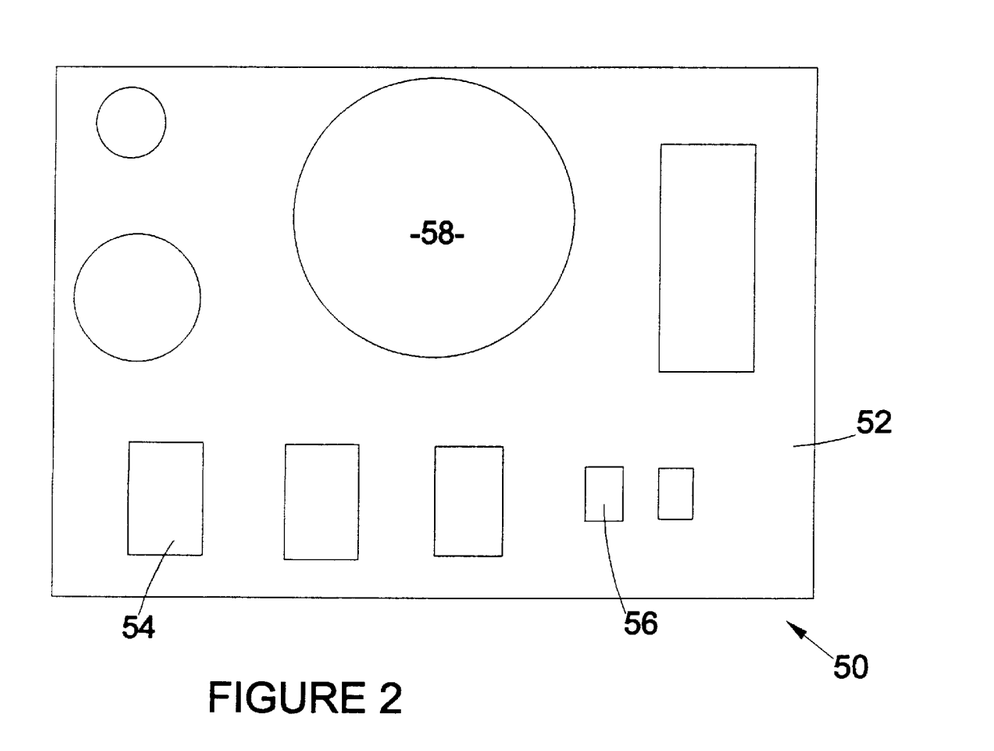
FIG. 2 is a front view of an alternate embodiment of the radio controlled engine kill switch of FIG. 1.

While in its simplest form a system is comprised of a single transmitter for the operator, as disclosed heretofore, the technology allows for a substantial number of transmitters to be used with a single receiver. The storage, activation and deactivation of the transmitters will vary dependent upon the size of the application, cost of manufacture and preferences of the end user. In the specific instance of a moderate craft system with approximately ten transmitters, the transmitters can be stored directly into the body of the receiver 14, as illustrated in FIGS. 1 and 2. Upon inserting the transmitter 12 into a storage port on the receiver 14 deactivation of the transmitted signal would occur. The transmitter 12 can be linked to the storage ports in either of two methods. In the first method, each storage port can be linked to a specific transmitter 12, requiring that the transmitter 12 must be placed on its respective storage port in order to deactivate the signal. This provides the advantage that the names of the users can be placed above the storage port and a transmitter 12 identified with a specific user. Indicator lights 30 can be used to indicate which of the transmitters 12 has activated the kill switch system 10. Alternatively, any transmitter 12 can be placed on any storage port, thereby deactivating the signal. Although this does not provide for the safety feature of knowing the identity of the party carrying each transmitter 12, it does make activation and deactivation simpler. The advantages of each system would be dependent upon the end use. The storage ports can contain a magnetic sensitive reed switch 56, or other means known in the art. When any transmitter is removed from the storage port, the transmitter signal would be automatically activated and recognized by the receiver 14 as an active transmitter 12.

FIG. 2 illustrates an alternate design and incorporates a locating device 58 within the kill switch system 50. The locating device 58, is incorporated in the receiver 52, and can be automatically activated upon deactivation of the transmitter 51 signal. The locating device 58 uses standard locating technology which preferably has been wired to become activated when the transmitter 54 signal is broken. By the nature of this device it becomes a locator for the person, or persons, that have broken transmission contact with the receiver 52. A simple directional antenna, tuned to the frequency of the transmitter 54 being worn by the lost party, can easily locate that party. For example, in the event the operator wearing a transmitter 54 was separated in violent seas from the craft, the engine kill switch would immediately shut down the engine and/or activate the visual and audible warning systems depending on programming. If the engine was deactivated, due to drift, wind, fog or other conditions, the separated party may be unable to be reunited with the craft. A search party, using a directional antenna, would be able to locate the transmission signal and consequently the lost party. The use of a single frequency provides an advantage by narrowing the scope of the search to the used frequency. Additionally, a single, consistent frequency makes it easier for other parties, such as the coast guard or Global Positioning Systems, to monitor for lost boaters. In the example of a cruise ship, it is entirely possible that a child left at port could be located with a directional antenna. Global positioning systems are decreasing in size, as well as becoming more financially affordable and can be easily incorporated within the disclosed system.

In the case where this technology were to be adapted to a large number of passengers such as a cruise ship, ferry, military or equivalent multi-passenger craft, this device would allow the operator to keep track of all or a specific group of passengers. If, for example, a cruise ship operator were to want to keep track of all children under the age of twelve, the operator may require the attachment of a small transmitter to the wrist of those occupants.

Figure 3:
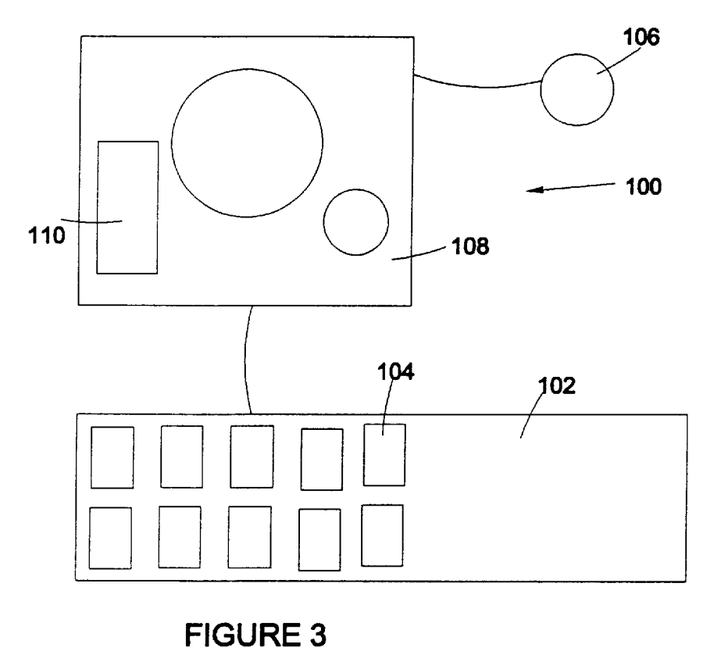
FIG. 3 is a schematic view of a radio controlled engine kill switch for a larger craft using a separate transmitter bar and receiver.

When larger numbers of transmitters are involved, as illustrated in FIG. 3, the transmitters 104 can be stored on a holding bar 102 wired to the receiver 108. The holding bar 102 can be proximate the receiver 108 or in an accessible location a distance from the receiver 108. The receiver 108 can be provided with a viewer 110, such as a LED, which will display the code of any transmitter 104 which has broken its signal with the receiver 108. On large ships, such as cruise or navy craft, the name of the person using each transmitter can be logged into the receiver 108 or tied into the ship's computer, representing a significant safety factor in the event a child fell overboard or was accidentally left at a port stop. In the event a transmission is broken, not only would the usual alarms be activated, but the identification of the person would be known. The loss of a transmitter signal would give an audible and/or visual signal in the control room and allow for appropriate action to be taken. The operator would know immediately, through the computer, all pertinent information concerning the wearer of the disconnected transmitter and expediting location of the user. This type of system would also possibly reduce the liability to the operator. This can also be helpful if it is known in advance that the person will not be in range and that the transmission will be broken, allowing the system 100 to be reset. Alternatively, the receiver 108 can be provided with the capabilities to override the alarm for any one transmitter 104 for a set period of time, reactivating at the expiration of the set period. This system can be advantageous with scuba divers wherein the transmitter 104 can be overridden for the period of time slightly less than the air supply in the tanks.

Figure 4:
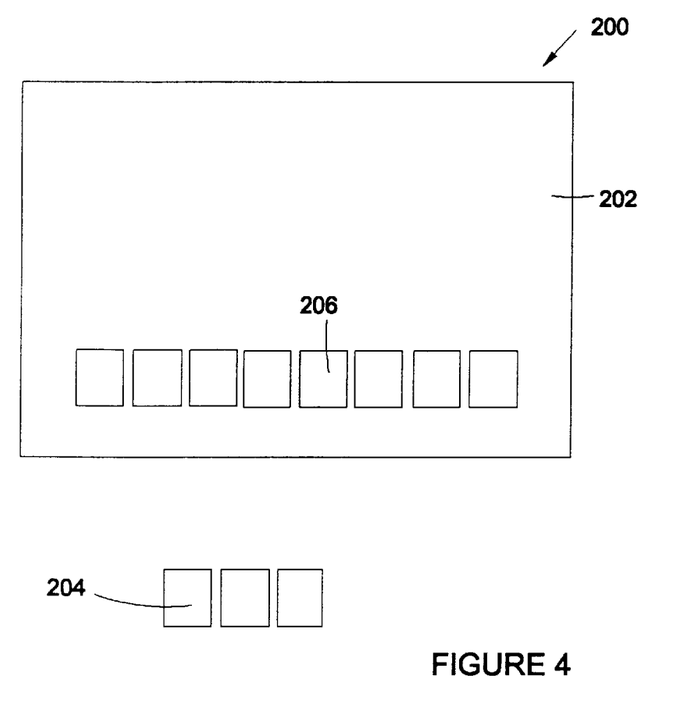
FIG. 4 is a front view of an alternate embodiment of the instant invention.

FIG. 4 illustrates an alternate engine kill switch system 200 wherein the receiver 202 and the transmitters 204 are not in physical contact during storage. Therefore the initial activation and subsequent deactivation must be through means other than removal of the transmitter 204 from the receiver 202. The transmitters 204 are picked up from the storage location and activated either at the storage location or taken to the receiver 202 for activation. Preferably, each transmitter 204 has its own activation light 206 on the receiver 202 to indicate that the transmitter 204 has been activated. Activation of the transmitters 204 can be through numerous methods, such as bar codes or magnetic readers. The emergency cut-off, or panic button, can also be used to activate the transmitter, although the method of activation must be completely different from the operation of the panic button. For example, the panic button would be pulled out and twisted to initiate transmitter activation. In instances where the users are consistent for long periods, such as a naval vessel, the transmitters 204 can be tied to a particular person upon each activation. This can be done through manual entry upon the time of activation or in combination with other identification methods which are currently being used in the particular application. In this embodiment, the indicator lights 206 can be a LED type, thereby providing a name, or other personal identification, upon activation of the transmitter 204.

Figure 5:
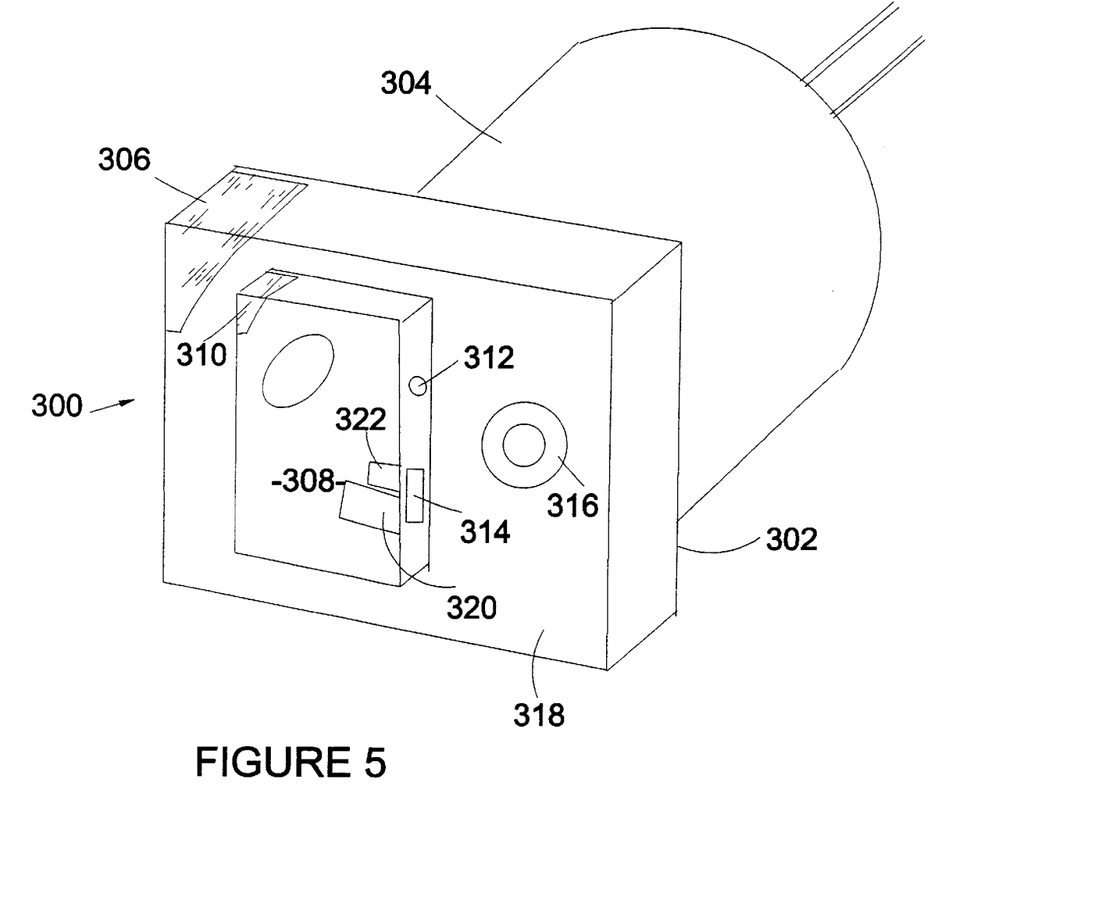
FIG. 5 is a perspective view of a single user receiver and transmitter.

A single user unit 300 is illustrated in FIG. 5 with the transmitter 308 attached to the receiver 302 for storage and/or recharging. In the embodiment illustrated, the front plate 318 has a larger perimeter than the round insert 304. The use of this configuration allows an easy-to-cut hole to be drilled into the mounting area, electrical connections made, and the unit 300 secured through use of screws or other means known in the art. Once mounted the front plate 318 covers the hole cut to receive the insert 304, providing a quick and easy installation. It should be noted, however, that the illustrated configuration is an example and other configurations can be used for both the front plate and insert.

As stated heretofore, the transmitter 308 continually sends the specific code to the receiver 302 until the signal is broken, as for example by distance or water. Although the distance between a boat and user would not be as critical prior to the signal being broken, in an overboard situation immediate reaction is required. For this reason, a water sensor 312 is used to immediately break the signal and initiate the engine shut down. As can be seen in the flow chart of FIG. 7, once water is detected by the water sensor 312, the transmitter 308 is turned off, and waits in an idle mode until the transmitter 308 is taken out of the water. Various methods can be used to reactivate the transmitter 308 once it is removed from the water, including adding a reactivation switch, including the reactivation in the circuitry, requiring reattachment to the receiver 302, or in the simplest form simply removal from the water. These, and other methods, will be apparent to those skilled in the art.

The attachment method of the transmitter 308 can be through use of any of several methods, or combinations thereof, known in the art, such as magnets, snap-on clips or a bottom indent. Due to the corrosive nature of salt water, it is preferable that the attachment method be easy to maintain. The transmitter 308 operates on batteries which are placed in the battery receiving area 320. As stated, the batteries are preferably rechargeable and are recharged directly from the receiver 302 in any of the various manners known in the art. The battery receiving area 320 is protected from the elements by closure cap 314. The closure cap 314 also allows for access to the code set panel 322 which contains any of the switches necessary to synchronize the signal with the receiver 302 or make any other manual circuitry changes necessary based on the electronics utilized.

Both the receiver 302 and the transmitter 308 preferably contain visual or audio means to determine their current status. As an example the illustrated unit 300, both the receiver 302 and transmitter 308 contain lights 306 and 310 respectively. In the example used in FIGS. 5–9, the lights 306 and 310 are both green when the transmitter 308 is attached to the receiver 302 to indicate that the transmitter 308 is charging. Once the transmitter 308 is removed from the receiver 302, the lights 306 and 310 turn red to verify that the link between the transmitter 308 and receiver 302 is in existence. The aforenoted low battery indicator can also be incorporated into the transmitter light 310 using a flashing mode to indicate the need to recharge. The transmitter's 308 low battery status can also be indicated on the receiver light 306 and would be activated by a weak signal. An audio signal can also be incorporated in the transmitter, similar to those used in pagers, to indicate a low battery.

The receiver 302 is armed or disarmed through use of a key switch 316. This also allows the system to be reset when needed. The key switch 316 can be provided with positions to arm, reset or disarm the system, thereby providing more alternatives for the user than simple on/off modes.

Figure 6:
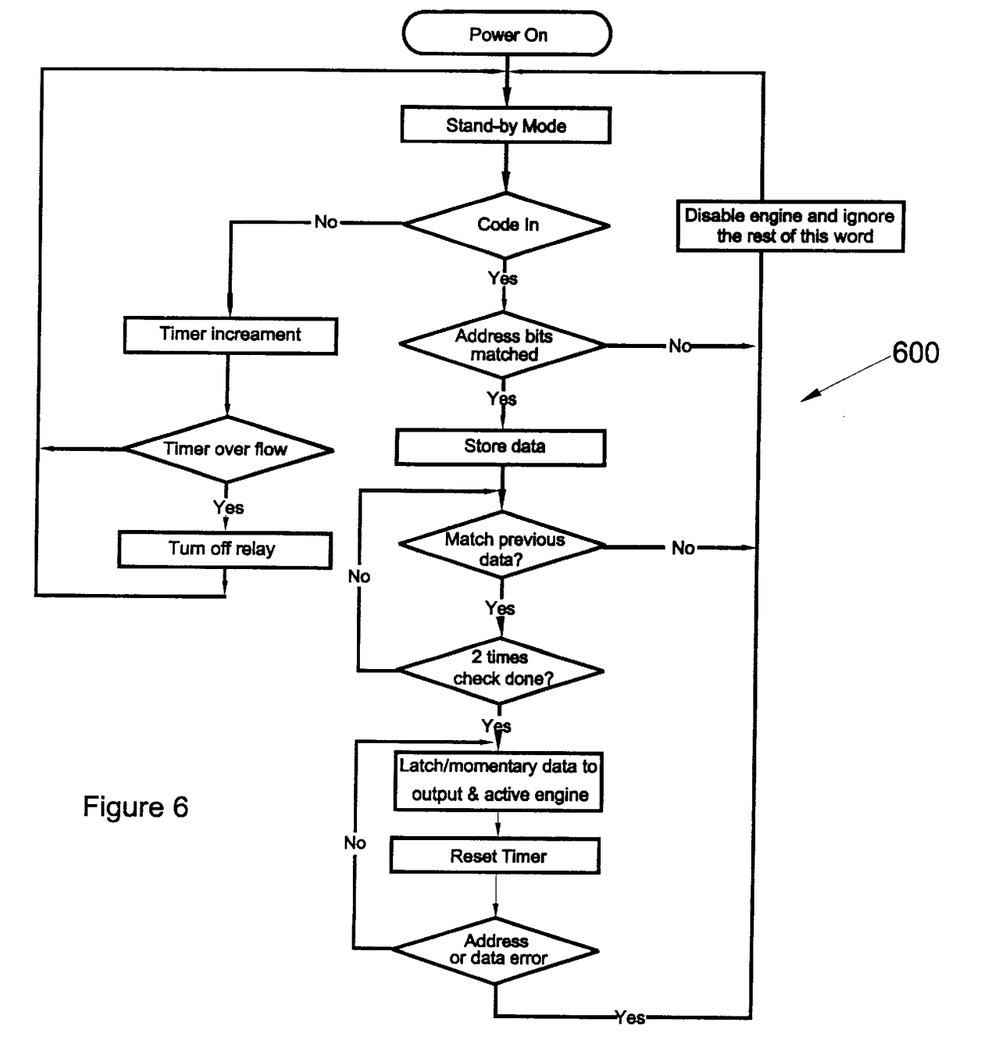
FIG. 6 is an example receiver flow chart for use with the engine kill switch of FIG. 5.
Figure 7:
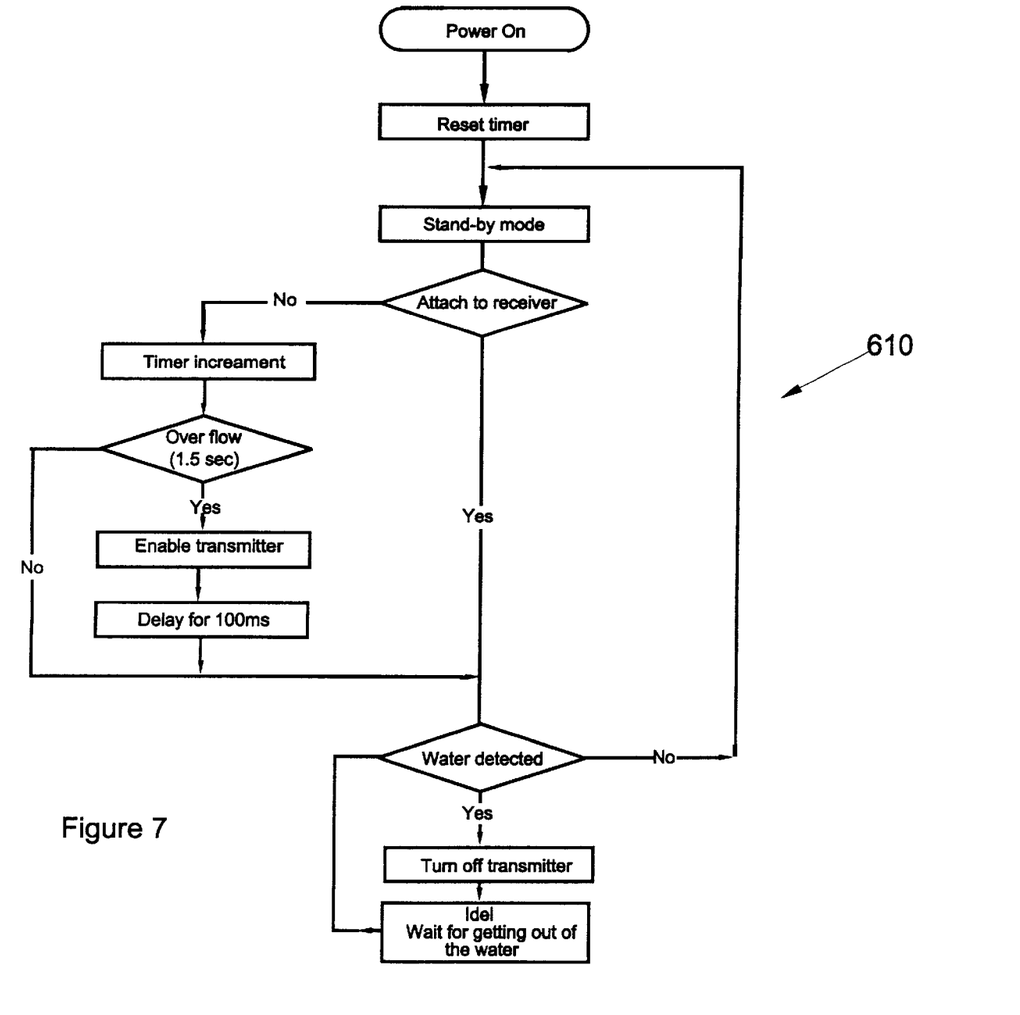
FIG. 7 is an example transmitter flow chart for use with the engine kill switch of FIG. 5.
Figure 8:
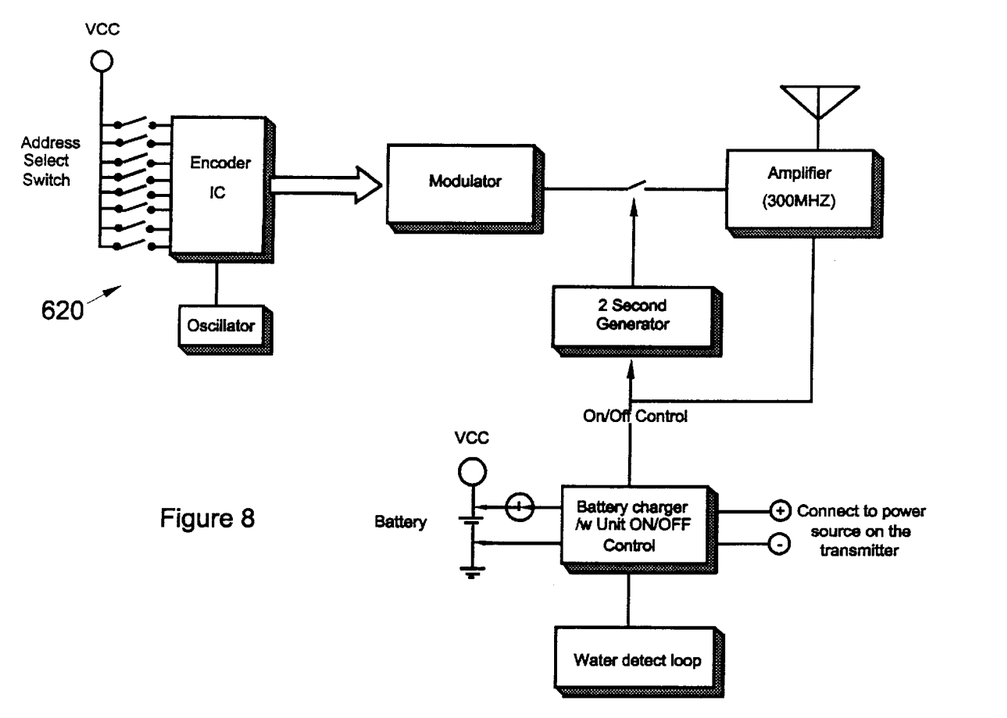
FIG. 8 is an example transmitter block diagram for use with the engine kill switch of FIG. 5.
Figure 9:
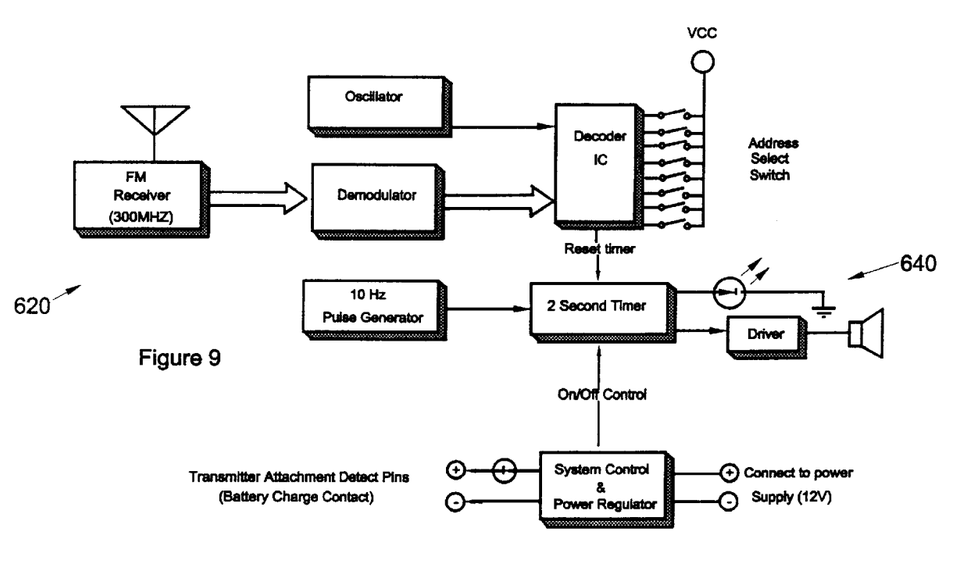
FIG. 9 is an example receiver block diagram for use with the engine kill switch of FIG. 5.

FIGS. 6 and 7 provide example control flowcharts for the receiver 302 and transmitter 308 of FIG. 5. The block diagrams of the example transmitter and receiver are illustrated in FIGS. 8 and 9. As can be seen from FIG. 6, once activated the receiver continually verifies that a code is being received, checking the code against the known address of the "partnered" transmitter. If the received code address matches the known code address, the receiver proceeds to cycle through the process. If, however, the code is not received, or an incorrect address is received, the system disables the motor. Various checks and balances, examples of which are illustrated in the flow chart 600, should be incorporated to prevent false shut downs. The transmitter 308, as charted in flow chart 610 continues in a stand-by mode until detached from the receiver. Once the transmitter is detached from the receiver, the transmitter circuitry adds the transmission loop, continually checking for the presence of water. If water is not detected, the system continues to loop. When water is detected, the system turns off the transmitter and enters a sub-loop continually checking for the presence of water. Once the transmitter is out of the water, the main loop is re-entered and the system proceeds transmitting. The basic elements of the receiver and transmitter are illustrated in the block diagrams 620 and 640.

The activation of the transmitter at the time of use can be incorporated with any of the foregoing embodiments. In the embodiments wherein the transmitter is activated by means other than removal from the receiver, a shut down mode must be provided. This can be accomplished through manual entry, repeating the initial activation step, turning off the engine or a combination thereof. Optionally more than one action can be required to shut down the transmitters in order to prevent inadvertent transmitter shut down. Additionally, any of the described features, such as audio alarm, locator, etc., can be utilized with any embodiment, whether or not it was described or shown in conjunction with the embodiment.

As stated heretofore, there are instances when automatically shutting down the engine can place the craft in danger of being capsized. As an alternative to manually switching from engine shut down to visual/audible systems, the engine kill switch can be used in conjunction with computerized sensing devices. The sending devices should track both the degree pitch and duration of time the craft has been pitching. Thus, in the event a signal is broken, the system checks the sensing device. If the pitch is greater than a preset standard and has been continuing for greater than the preset period of time, the system makes the determination not to shut off the engine. By checking both the duration of the pitching, as well as the degree, boat wakes and other short term disturbances, will not eliminate the deactivation of the engine.

The disclosed system can also be modified to serve as antitheft for rental boats, water skis, and other engine powered vehicles. The vehicles would be equipped with a small, single transmitter receiver. The transmitter would operate as described heretofore, with the addition of a programmable time and signal chip. The transmitters would be programmed to transmit a code to the receiver for a predetermined amount of time, for example one and a half hours in the event of an one hour rental. After the predetermined time has run out, the code would cease transmitting, therefore deactivating the engine. A location code would subsequently commence transmission, allowing the owner of the vehicle to locate the missing vehicle. For safety reasons, it is recommended that a warning signal be emitted from the receiver and/or transmitter indicating that the vehicle must be returned. A countdown timer can also be incorporated in the receiver, indicating the time remaining on the rental.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. An engine deactivation system for use with user operated water vehicles, said system having:

at least one waterproof transmitter, each of said at least one transmitter being a portable device transmitting a constant individually identifiable signal powered by an independent power supply, said signal being water sensitive and blocked from said receiver when said transmitter enters the water;

a waterproof receiver, said receiver receiving and recognizing said individually identifiable signal from each of said at least one transmitter, said receiver having cut-off means, said cut-off means being connected to an engine and having a run mode and a deactivation mode, said deactivation mode shutting down said engine; and an antenna, said antenna transmitting said signal between said transmitter and said receiver;

manual reset means, said manual reset means over riding said receiver cut-off means to manually place said cut-off means in said run mode or said deactivation mode;

wherein receipt of said signal by said receiver maintains said cut-off means in a run mode and interruption of said constant signal from one of said at least one transmitter immediately activates said deactivation mode, thereby requiring reactivation of said vehicle by reinstating transmission of said signal to place said cut-off means in said run mode or over riding said cut-off means with said manual reset means.

2. The engine deactivation system of claim 1 wherein said signal has a low threshold of transmission through water.

3. The engine deactivation system of claim 1 further comprising on-off means, said on-off means deactivating said receiver.

4. The engine deactivation system of claim 1 wherein said independent power supply is a rechargeable battery.

5. The engine deactivation system of claim 4 wherein said transmitter is in a position proximate said receiver when not in use, wherein said proximate position provides recharging of said rechargeable battery.

6. The engine deactivation system of claim 5 wherein said transmitter begins transmitting said signal upon separation of said transmitter from said receiver and ceases transmission when proximate said receiver whereby said receiver's acknowledging said transmitter's proximity maintains said cut-off means in said run mode.

7. The engine deactivation system of claim 1 wherein said transmitter further comprises an on/off means.

8. The engine deactivation system of claim 1 further comprising at least two indicator lights, said indicator lights designating the power status of said transmitter and said receiver.

9. The engine deactivation system of claim 8 wherein said indicator lights designate the power level of said independent power supply within said transmitter.

10. The engine deactivation system of claim 9 wherein said indicator lights are color coded to designate at least one of recharging, transmitting or low battery status check.

11. The engine deactivation system of claim 1 further comprising distance control back up means, said distance control back up means varying the signal recognition threshold between said transmitter and said receiver, thereby immediately activating said deactivation mode upon separation of said transmitter and said receiver beyond a predetermined distance.

12. The engine deactivation system of claim 1 wherein said transmitter further comprises water sensor means, said water sensor means halting transmission of said signal from said transmitter to said receiver upon submersion in water.

13. The engine deactivation system of claim 1 wherein said receiver has coding means, said coding means taking said individually identifiable signal from each of said at least one transmitter and coding said receiver to recognize each of said individually identifiable signals.

14. The engine deactivation system of claim 1 further comprising data processing means, said data processing means receiving data identifying said individual signal from each of said at least one transmitter said receiver confirming each of said at least one transmitter is in communication with said receiver, integrating data received from said individual signal into a database and displaying said integrated data.

15. The engine deactivation system of claim 1 further comprising direct over ride means within said receiver, said direct over ride means enabling said vehicle to remain in said run mode without activating said transmitter to re-transmit said signal.

16. The engine deactivation system of claim 1 further comprising water resistant audio alarm means, said audio alarm means having a pitch capable of being heard over ocean waves and ambient sound and being activated upon deactivation of said transmitter signal.

17. The engine deactivation system of claim 1 further comprising waterproof visual alarm means, said visual alarm means having a sufficient intensity to be seen long distances in inclement weather and being activated upon deactivation of said transmitter signal.

18. The engine deactivation system of claim 1 further comprising an emergency cut-off means within each of said at least one transmitter, manual activation of said emergency cut-off means breaking transmission of said signal, thereby placing said cut-off means in said deactivation mode.

19. The engine deactivation system of claim 18 further comprising protection means, said protection means preventing said emergency cut-off means from being inadvertently activated.

20. The method of disabling an engine by the elimination of an individually recognized signal using a device having:
at least one waterproof transmitter, each of said at least one waterproof transmitter being a portable device transmitting a constant individually identifiable signal powered by an independent power supply, said signal having a low transmission through water; at least one indicator light, said indicator light designating the power status of said transmitter;
a waterproof receiver, said receiver receiving and recognizing said identifiable signal from each of said transmitters, said receiver having cut-off means, said cut-off means being connected to an engine and having a run mode and a deactivation mode, said deactivation mode shutting down said engine; on-off means, said on-off means deactivating said receiver; at least one indicator light, said indicator light designating the power status of said receiver; manual reset means, said manual reset means over riding said receiver cut-off means to manually place said cut-off means in said run mode or in said deactivation mode;
distance control means, said distance control means varying the maximum transmission distance between said transmitter and said receiver, determining at what distance said signal is blocked from said receiver, placing said cut-off means in said deactivation mode;
an antenna, said antenna transmitting said signal between said transmitter and said receiver;
comprising the steps of:
a) activating said receiver through said on-off means;
b) verifying the power status of said transmitter;
c) attaching said transmitter to a user;
d) verifying that said receiver is receiving said individually identifiable signal;
wherein receipt of said signal by said receiver maintains said cut-off means in a run mode and interruption of said constant signal from any one of said at least one transmitter, immediately activates said deactivation mode, thereby requiring reactivation of said vehicle by reinstating transmission of said signal to place said cut-off means in said run mode or over riding said cut-off means with, said manual reset means.

21. A signal transmission device having:
at least one waterproof transmitter, each of said at least one transmitters being a portable device transmitting a constant individually identifiable signal powered by an independent power supply, said signal having a low transmission through water; on/off means, said on/off means controlling said independent supply;
a waterproof receiver, said receiver receiving and recognizing said identifiable signal from each of said transmitters, and having:
cut-off means, said cut-off means being connected to an engine and having a run mode and a deactivation mode, said deactivation mode deactivating said engine, on-off means, said on-off means deactivating said receiver, coding means, said coding means taking said individually identifiable signal from each of said at least one transmitter and coding said receiver to recognize said signal;

over ride means, said over ride means allowing said cut-off means to be in said run mode without receiving said signal;

at least one indicator light, said indicator light designating the power status of said receiver and said at least one transmitter, said at least one indicator light being color coded to designate at least one of recharging, transmitting or low battery status checks;

distance control means, said distance control means varying the maximum transmission distance between said transmitter and said receiver;

audio alarm means, said audio alarm means being activated by said deactivation mode;

visual alarm means, said visual alarm means being activated by said deactivation mode;

an antenna, said antenna transmitting said signal between said transmitter and said receiver;

said transmitter being proximate said receiver when not in use, and initiating transmission of said signal upon separation of said transmitter from said receiver and ceasing transmission when proximate said receiver wherein receipt of said signal from all separated transmitters by said receiver maintains said cut-off means in a run mode and interruption of said constant signal by said transmitter entering the water, or being taken beyond transmission range, from any one of said transmitters initiates said deactivation mode, and either reinstatement of transmission of said signal or activation of said over ride means places said cut-off means in said run mode.

* * * * *